June 23, 1953 J. S. OGLE 2,642,974
COIN MATERIAL TESTING DEVICE
Filed Nov. 30, 1949
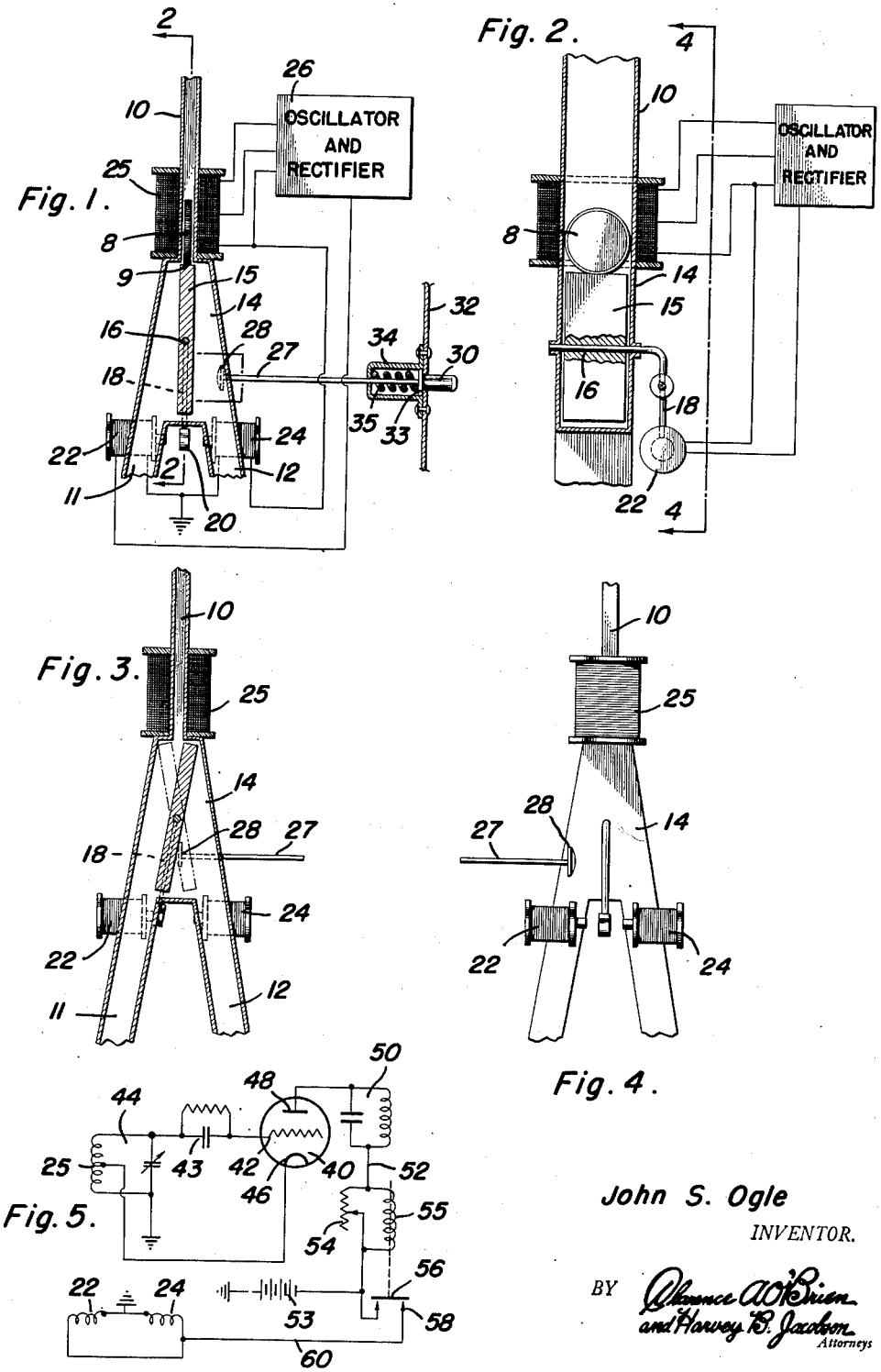
John S. Ogle
INVENTOR.

Patented June 23, 1953

2,642,974

UNITED STATES PATENT OFFICE 2,642,974

COIN MATERIAL TESTING DEVICE

John S. Ogle, Klamath Falls, Oreg., assignor of forty-nine per cent to Harold H. Ogle, Jr., Klamath Falls, Oreg.

Application November 30, 1949, Serial No. 130,220

3 Claims. (Cl. 194—100)

This invention relates to coin operated apparatus and more particularly to the coin testing devices of such apparatus by means of which coins or slugs which have been inserted into the coin slots are subjected to a testing operation, rejecting spurious coins, tokens or slugs or other objects not conforming to a given specification, and it has for its primary object to provide a simple and effective coin testing device which performs the testing of the composition, the size, the weight of the coin, token or slug in a single operation.

Coin testing devices, especially those adapted to test coins of a higher denomination, usually have to use a number of separate testing devices in order to ascertain the simultaneous presence of a number of features. In most known devices a test for composition of the coin or token is a magnetic test which is however ineffective if slugs or spurious coins of brass, aluminum and of other non-ferric metals are used. Therefore, tests based on the size, thickness and the weight of the coins or other combined testing devices have to be used in addition to the magnetic testing device. This renders devices of this type involved so that they frequently get out of order. Moreover it is difficult to adjust the coin tester in such manner that it does not reject genuine coins with small defects while on the other hand excluding slugs cut to the same diameter and having approximately the same weight.

It is a main object of the invention to provide a device which submits the coin to a single test detecting all major departures from the composition, size or weight.

According to the invention the test is conducted by means of the change of inductance of an inductance coil which is produced by a coin or token introduced into the interior of the coil or otherwise influencing the magnetic field of the coil, the small inductance change thus produced being made operative by means of a tuned oscillator arrangement with at least two tuned oscillation circuits, one of which contains the aforesaid inductance coil. High frequency oscillations at resonance frequency can only be produced in such an oscillator arrangement if both oscillation circuits are tuned to practically the same frequency. While one of the circuits may be fixedly tuned to the resonance frequency the other circuit may be provided with the inductance coil, the inductance of which is changed to the value producing resonance by inserting into the interior of the coil the coin to be tested.

It is a further object of the invention to provide means, including an oscillator arrangement producing high frequency oscillations and tunable to resonance frequency by means of tuned circuits one of which contains a coil the inductance of which is adjusted by means of the coins to be tested to the value producing resonance.

It is a further object of the invention to provide means, including an oscillator arrangement for producing high frequency oscillations, tunable to resonance and provided with a plurality of circuits which have to be tuned to the same frequency to obtain such resonance, one of said circuits having an inductance coil which is influenced by the coin to be tested, while the oscillations produced at resonance are used to operate a selector mechanism accepting or rejecting a coin inserted into the slots of the apparatus.

It is a further object of the invention to provide, in connection with the aforesaid device, means for introducing a coin to be tested to the interior of an inductance coil and for holding the coin in this position until the selector mechanism has been operated.

It is a further object of the invention to provide, in connection with the aforesaid device, an inductance coil surrounding a coin chute through which the coin to be tested may be introduced into the interior of said inductance coil, said coil forming the active inductance of the input circuit of an oscillator, the other circuits of which have been tuned to a definite frequency, said inductance coil being so adjusted within said input circuit that no oscillation occurs in the oscillator as long as the magnetic field of the coil is not influenced by metal introduced into the interior of the coil, while no oscillation at resonance frequency can occur until the inductance of the coil has been changed to a predetermined extent by the introduction of a coin of a predetermined specification.

A further object of the invention consists in providing in connection with a device aforedescribed, a selector mechanism, adapted to occupy three different positions, one of these positions being a position of rest, arresting the coin sliding down along the coin chute and holding it in a given position in the interior of an inductance coil, the two other positions being reached when the selector is operated by an electromagnetic system, such operation being dependent on the appearance of oscillations in the oscillator arrangement and on the amplitude of the oscillations thus produced.

Further objects of the invention are more specific and will be apparent from the following specification.

The invention is illustrated in the accompanying drawing by way of example. It is however to be understood that the example shown has been selected in order to illustrate and to explain the principle of the invention and the best mode of applying said principle. Further modes of application will be obvious to persons skilled in this art and modifications of the example shown in the drawings are therefore not necessarily departures from the principle of the invention.

In the accompanying drawing:

Figure 1 is a diagrammatic elevational view of the coin tester according to the invention, the device being shown in section, the section being taken through the median plane.

Figure 2 is a sectional elevational view of the coin chute, the section being taken along line 2—2 of Figure 1.

Figure 3 is an elevational sectional view similar to Figure 1 the selector plate being shown in different positions.

Figure 4 is a side view of the device viewed from a plane indicated at 4—4 in Figure 2.

Figure 5 is a diagram of the connections of the oscillator.

As above explained the principle of the invention consists in providing a coin chute within which the coin is arrested and held in the interior of an inductance coil surrounding the chute and forming part of a tuned oscillation circuit which is preferably the input circuit of an oscillator. Said oscillator is provided with a tuned output circuit which may operate relays or may furnish a current acting on an electromagnet or on an electromagnet system which operates a movable selector arm or plate. Said selector arm or plate arrests the coin in one position, but directs the coin into an acceptance channel or into a rejection channel when in other positions. The coin introduced into the coin chute which has reached the position in proximity to the inductance coil changes the inductance of the coil and thereby the tuning of the oscillation circuit of which the coil forms a part. If the oscillation circuits associated with the oscillator are sharply tuned to a resonance frequency only a coin of the right composition, size and weight will so change the inductance of the coil, and thereby the inductance active in the circuit that an oscillation will set in in the output circuit which is at its peak or resonance value. The oscillations thus set up in the output circuit may operate a relay or may influence the electromagnetic system of the selector and the latter will therefore either accept or reject the coin which was held by it in the chute. Such acceptance or rejection is obtained by a bifurcation of the chute at the point at which the selector is arranged and by guiding the coin towards a channel leading to the coin operated apparatus or machinery and to the collection box or by deflecting it into a return chute either immediately or after operation of a suitable hand operated mechanism.

The device according to the invention is usable in connection with any coin controlled apparatus and therefore merely a portion of a coin chute 10 is shown through which the coin 8 may drop after having been inserted into the slot of the apparatus which is not shown. The coin chute is bifurcated so that discharge of the coin from that portion of the chute through which the coin was admitted into two channels 11, 12 may take place, one of said channels leading to the coin return delivering the rejected coins or slugs to the customer operating the apparatus while the other channel 12 is the acceptance channel leading to the apparatus to be operated by the coin in which the coin performs its function of controlling the apparatus and is collected in a collecting box after having performed said function.

At the bifurcation point the coin chute 10 is preferably enlarged so as to form a chamber 14. In this chamber a selector plate or disk 15 is arranged which is of a suitable thickness and which extends along the discharge opening of said chute in close proximity to said opening. The selector plate or disk 15 is held by a pintle 16 which is swingably mounted in the center of the chamber 14. The pintle is preferably arranged in the plane of the coin so that a small movement of the selector plate or disk frees the discharge end of the chute and permits the coin to slide along the selector plate or disk to one of the two channels 11, 12. The pintle 16 extends to the outside and on the outside is provided with an extension arm 18 preferably at an angle to the pintle and of appropriate length. This arm carries an armature 20 adapted to cooperate with a pair of electromagnets 22, 24 the function of which is described below.

The selector plate or disk 15 is so positioned in the chamber 14 that its upper edge is located slightly below the discharge end of the coin chute 10. When in its middle position which is also its position of rest it arrests and supports a coin 8 which has been inserted and which has dropped down the chute.

Near this point 9 at which the chute ends it is surrounded by an inductance coil 25 which forms part of a tuned input circuit of an oscillator 26 which is also provided with a tuned output circuit. The oscillator may be of any approved type for instance of the well known Colpitt or Hartley type. The oscillator must have a sharp resonance tuning. The inductance coil 25 must be so adjusted that only when the coin 8 fills its interior and corresponds to a given specification with respect to composition, size and weight the oscillation circuit of which this coil forms a part is tuned to resonance.

The high frequency oscillations produced by the oscillator 26 may be amplified and rectified and may then act directly on the pair of magnets 22, 24 which in this case act in conjunction and move the armature 20 towards the electromagnet 24 upon energization. When the armature is moved in this direction a movement of the selector plate 15 is produced which is clockwise. This movement frees the coin which is no longer supported and which may now slide along the selector plate or disk 15 into the acceptance channel 12. When the coin has been discharged the selector plate being no longer held by the magnets 22, 24 returns, suitable means (not shown) being provided for this purpose. These means may consist in a suitable selection of the weight of the preferably magnetized armature 20 which returns the plate to a vertical position.

If a slug or a spurious coin is inserted instead of the coin which is acceptable or if a coin made of a different metal of a markedly different size or weight is inserted resonance will not be reached as the difference between the preselected tuning of the oscillator circuit and its tuning for resonance will not be bridged in the case of an unsuitable coin or slug but will only be covered in the case of a coin. When resonance cannot be reached the selector plate 15 remains in its position.

A push rod 27 may be mounted within the apparatus operated by the coin in such a manner that its end passes through a hole in the wall of chamber 14. The head 28 at the end of rod 27 is located within the chamber at a certain distance from the selector plate or disk 15. This distance is so chosen that it permits a free movement of the selector plate or disk around the pintle 16 and a free passage of the coin.

On its outer end the push rod 27 carries a push button 30 projecting from the wall 32 of the coin controlled apparatus which is accessible from the outside and may be pressed down by the customer. Preferably the push button is provided with a piston forming a spring retainer and guide piece 33 which is movable within a cylinder 34 against the pressure of a spring 35. When the push button 30 is depressed by the customer inserting the coin the end 28 of the push rod 27 engages selector plate 15 and moves it in a clockwise direction as shown in Figure 3.

A simplified circuit of type described is shown in Figure 5 by way of example. The grid 42 of the oscillator tube 40 is connected over the customary condenser-grid leak assembly 43 with the oscillation circuit 44, the coil 45 of which is identical with coil 25. This circuit is so tuned that it is in resonance with the frequency at which the tube oscillates only when the coin to be tested has been inserted. The coil is tapped in the middle and is connected with the cathode 46 in a well known manner. The plate 48 is also connected with a tuned oscillation circuit 50, tuned in this case to the selected frequency of the oscillator.

The plate circuit 52 moreover contains the relay 55 and the adjustable resistance 54 in parallel therewith.

The relay is in this case provided with an armature 56 closing its contacts when the relay is de-energized.

The plate circuit 52 as well as the relay circuit 60 containing the electromagnets 22, 24 may be supplied from a local source of current 53.

In this example instead of a rectification of the currents produced by the tube a local current controlled by a relay is used.

The operation of the apparatus will be clear from the above description. The circuit arrangement of the oscillator is such that the oscillator cannot set up oscillations when the circuit is not tuned to the desired frequency. The empty coil has such an inductance that the input oscillation circuit is out of tune with the output oscillation circuit so that no oscillation will occur. When a coin of the proper composition, size and weight is inserted by the customer it drops along the chute 10 to the point 9 where the chute joins the chamber 14 and it is arrested by the selector plate 15 facing the discharge opening of the chute.

The coin is held at this place within the interior of the inductance coil 25 thereby changing the inductance of the coil. This inductance is thereby brought to its resonance value, the oscillator starts to oscillate and the oscillation currents thus produced after amplification and rectification operate the magnet system 22, 24 moving the armature towards the magnet 24. The selector plate or disk 15 is thereby moved to the position shown in dotted lines in Figure 3 in which the lower end of the plate or disk 15 has been shifted towards the right in the said figure while the upper part of the plate or disk is shifted toward the left. The discharge end of the chute is thereby freed and the coin is released and being no longer supported, it slides along the selector plate which is now in an inclined position towards the acceptance channel 12. As the interior of the coil is now again empty oscillations in the oscillation circuit stop, the magnet is de-energized and the selector plate returns to its original position.

According to the modification shown in Figure 5 a relatively large plate current is always flowing through the plate circuit 52 of the tube and thereby also through relay 55 which attracts its armature and thereby opens circuit 60. This current is adjustable. If resonance is established the tube 40 starts to oscillate the plate current decreases and the armature 56 of relay 55 drops thus closing the circuit 60 energizing the magnets 22, 24. When the selector disk is moved by the magnets, oscillation stops the plate current increases and the relay attracts its armature, thus causing return of the selector plate.

If a slug or a spurious coin has been inserted no oscillation will occur and the selector plate or disk 15 will not move. If the button 30 is now pressed the selector plate or disk 15 is moved into the position shown in full lines in Figure 3 the discharge end of the chute 10 is freed and the slug or spurious coin is directed toward the return chute 11.

When an operation of this type takes place the customer is preferably advised that he should press the button before inserting his coin in order to free the chute of slugs or spurious coins which may have still been retained from a previous operation and in order to avoid return of the genuine coin together with the spurious coin at the first operation.

It will be clear that changes of an unessential nature and especially structural changes will not affect the principle of the invention.

Having described the invention, what is claimed as new is:

1. A coin testing device for a coin operated mechanism, comprising a bifurcated coin chute, connected with two channels, one of said channels leading to the coin operated mechanism and the other forming a coin rejection and return channel, means arranged at the bifurcation of the coin chute at the point of connection of the latter with the aforesaid two channels, for closing said chute in a normal position of rest and for connecting it with either the one or the other of said channels when operated, an automatic means for operating the aforesaid means arranged at the bifurcation in one direction, the latter opening the chute and connecting it with the channel leading to the coin operated mechanism, said automatic means including an oscillator adapted to oscillate at resonance frequency, with an oscillation circuit maintained in a state of near resonance, an inductance coil forming part of and included within said oscillation circuit, said inductance coil surrounding the portion of the chute closed by the aforesaid means arranged at the bifurcation of the coin chute, and having an inductance of a value which normally differs from the resonance value but which corresponds to the value of resonance of the oscillation circuit if the portion of the coin chute surrounded by the coil is filled with a coin of a predetermined size and material, and a separate device for operating the aforesaid means arranged at the bifurcation point, the separate operation connecting the chute with the rejection and coin return channel.

2. A coin testing device for a coin operated mechanism comprising a bifurcated coin chute connected with two channels, one of the channels being the operative channel leading to the coin operated mechanism and the other being a coin return channel, a movable combined coin resting and holding, channel selecting element adapted to occupy three positions, and being alignable with and forming part of the wall of either of the two channels in two of said positions, while closing the chute and stopping the coin at the bifurcation point of the chute at which the coin may enter either one of the two channels in its normal third position of rest, means for moving automatically the said element into the position in which it frees the chute and aligns itself with the operating channel, thus connecting the latter with the chute, means for moving said element manually into the position to which it is aligned with the coin return channel, connecting the latter with the chute, said automatic means including an operating magnet and means operated by said magnet and attached to the said combined coin resting and holding element, an inductance coil encircling that portion of the chute which is closest to the bifurcation point, an oscillator adapted to oscillate at resonance frequency, said oscillator including an oscillation circuit maintained in a state of near resonance, the aforesaid inductance coil being part of the said oscillation circuit and the tuning element thereof and being tuned to a value normally differing from the resonance value, but corresponding to the value of resonance of the oscillation circuit if a coin of a predetermined size and material is held within the portion of the coin chute surrounded by the inductance coil, means operated solely when the current in the oscillator reaches its resonance value for operating the said magnet, and separately operated means for aligning the aforesaid element with the coin rejection and return channel and for directing the coin into the said channel.

3. A coin testing device for coin operated mechanisms comprising a coin chute including a bifurcated test channel which is adapted for connection with an operative channel leading to the coin operated mechanism and with a coin return channel respectively, an oscillator-detector for producing high frequency oscillations, including an oscillation circuit tuned to near resonance, with an inductance coil forming one of the tuning elements of the oscillation circuit, so adjusted that the said oscillation circuit is normally tuned to near resonance only, said inductance coil being arranged at the bifurcation point surrounding the test channel, the inductance of the coil being changed by the presence of a coin of predetermined size and material in the test channel so as to produce resonance in the oscillation circuit, a swingable combined coin resting and holding element adapted to occupy three positions, the said element closing the test channel in its position of rest and being adapted to form a slide member for the coin leading the same to the operating channel and to the rejection and return channel respectively when moved out of its position of rest into one of its two other positions, an arm and armature connected with the said swingable coin resting and holding element for swinging the same, an operating magnet for moving said armature into one direction, a control circuit for said magnet, means for energizing said electromagnet when the oscillator reaches a state of resonance, said magnet swinging the swingable element into a position in which it connects the test channel with the operating channel leading to the coin operated mechanism and a hand operated mechanism for swinging the said element into a position in which it acts as a slide member leading the coin from the test channel into the rejection and return channel.

JOHN S. OGLE.

References Cited in the file of this patent

UNITED STATES PATENTS

| Number | Name | Date |
|---|---|---|
| 1,204,752 | Eldridge | Nov. 14, 1916 |
| 1,386,701 | Goodrum | Aug. 9, 1921 |
| 1,555,910 | Chester | Oct. 6, 1925 |
| 2,045,769 | Geffcken | June 30, 1936 |
| 2,234,895 | Cerveny | Mar. 11, 1941 |

FOREIGN PATENTS

| Number | Country | Date |
|---|---|---|
| 451,694 | Great Britain | Nov. 7, 1934 |